March 22, 1932.   J. P. LEINDORF   1,850,508
PERCH FOR BIRD CAGES
Filed May 16, 1931
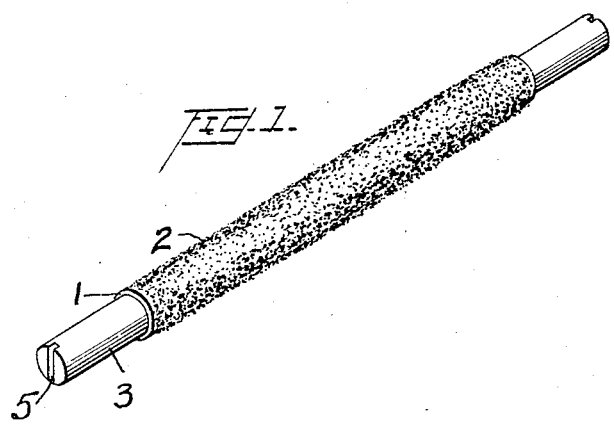
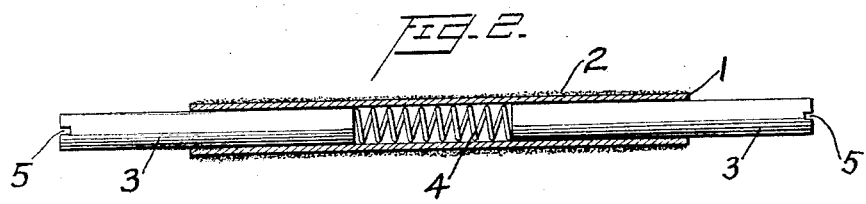
Inventor
Joseph P. Leindorf,
By Chas. Silver   Attorney

UNITED STATES PATENT OFFICE

JOSEPH P. LEINDORF, OF NEW YORK, N. Y.

PERCH FOR BIRD CAGES

Application filed May 16, 1931. Serial No. 537,864.

This invention relates to perches for bird cages.

Among the objects of this invention is to provide a perch for bird cages which may be readily removed from the cage for cleaning, is adaptable to cages of various sizes and has abrasive means for enabling a bird to sharpen or roughen its bill, nails, and feet.

Other, further, and more specific objects of this invention will become readily apparent to persons skilled in the art from a consideration of the following description when taken in conjunction with the accompanying drawings wherein:

Fig. 1 is a perspective view of my novel perch for bird cages.

Fig. 2 is a longitudinal cross-section of the perch shown in Fig. 1.

This perch comprises a tube 1, of compressed paper or wood, having an outer abrasive coating 2, preferably of gravel, sand or emery, held together by a binding material such as glue. At each end of the tube there is inserted the supporting members or sticks 3 which are held in spaced relation by the resilient member or spring 4. These sticks 3 fit closely into the tube 1, but are slidable therein. The outer ends of each of these sticks 3 are provided with notches 5.

In using this perch, the notches 5 fit on wires at opposite sides of the cage. By providing the interior spring 4, the supporting sticks 3 can be moved inwardly and thus adapt this perch to bird cages of varying sizes. Furthermore, the pressure of the spring against the sticks 3 is transmitted to the wires of the bird cage upon which the notched ends are positioned and serves to arrest movement of the perch upon the wires of the cage. Most bird cages are provided with one or more horizontal or cross wires to hold the vertical wires in proper position, and with these kinds of cages, it is advisable to move the perch until the ends of the supporting members 3 rest upon these cross wires with the notches 5 receiving opposite vertical wires.

My novel perch may be readily positioned in the bird cage and if desired, easily removed for cleaning. If the tube (1) has become worn or rendered unserviceable from any other cause, it may be replaced without altering the other parts of the perch. The tube 1 with the abrasive coating thereon affords the bird while in captivity one of the very great comforts of its native and wild life, that is, the means for self-dressing, sharpening or roughening its bill, nails and feet, thereby dispensing with the need of performing these services for the bird by an attendant.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claim.

I claim as my invention:

In a perch for bird cages, a tubular member, a resilient member within said tubular member, a supporting member fitting into an end of said tubular member and slidable therein, another supporting member fitting into the other end of said tubular member, said supporting members having their outer ends notched for engaging the wires of the cage and being positioned to receive pressure directed outwardly upon their inner ends from said resilient member, and said tubular member having abrasive material upon its surface.

In testimony whereof I affix my signature.

JOSEPH P. LEINDORF.